US009743293B1

(12) United States Patent
Lennen

(10) Patent No.: US 9,743,293 B1
(45) Date of Patent: Aug. 22, 2017

(54) SYSTEM AND METHOD FOR LOCAL SPREADING CODE MANIPULATION FOR INTERFERENCE MITIGATION

(71) Applicant: Samsung Electronics Co., Ltd., Suwon-si, Gyeonggi-do (KR)

(72) Inventor: Gary Lennen, Cupertino, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/285,458

(22) Filed: Oct. 4, 2016

Related U.S. Application Data

(60) Provisional application No. 62/366,619, filed on Jul. 25, 2016.

(51) Int. Cl.
| G01S 19/21 | (2010.01) |
| H04W 24/02 | (2009.01) |
| H04W 72/04 | (2009.01) |
| H04M 15/00 | (2006.01) |
| G01S 19/22 | (2010.01) |

(52) U.S. Cl.
CPC .......... *H04W 24/02* (2013.01); *H04M 15/58* (2013.01); *H04W 72/046* (2013.01)

(58) Field of Classification Search
CPC ......... G01S 19/21; G01S 19/215; G01S 19/30
USPC .................................................. 342/357.59
See application file for complete search history.

(56) References Cited

U.S. PATENT DOCUMENTS

| 6,975,673 | B1 | 12/2005 | Rouquette |
| 7,860,145 | B2 | 12/2010 | Knight et al. |
| 7,894,556 | B2 | 2/2011 | Casabona et al. |
| 8,238,410 | B2 | 8/2012 | Lennen |
| 9,065,521 | B1 | 6/2015 | Dybdal et al. |
| 2010/0259437 | A1* | 10/2010 | Dixon ................ G01S 19/21 342/16 |

OTHER PUBLICATIONS

Arinc Engineering Services, LLC, "Navstar Global Positioning System," Interface Specification, Navstar GPS Space Segment/Navigation User Interfaces, IS-GPS-200, Mar. 7, 2006, 221 pages.
Borio, Daniele, "GNSS Acquisition in the Presence of Continuous Wave Interference," IEEE Transactions on Aerospace and Electronic Systems, vol. 46, No. 1, Jan. 2010, 15 pages.

(Continued)

*Primary Examiner* — Lee Nguyen
(74) *Attorney, Agent, or Firm* — Renaissance IP Law Group LLP

(57) ABSTRACT

According to one general aspect, an apparatus may include a receiver, a processor, and a correlator circuit. The receiver may be configured to receive a satellite navigational system signal. The processor may configured to, if an interference signal is detected: receive an indication of a detected interference signal, and generate a modified coarse/acquisition (C/A) code, wherein the modified coarse/acquisition (C/A) code includes a null value for at least one frequency portion associated with the interference signal. The correlator circuit may be configured to, if an interference signal is detected, generate a correlated signal in which the interference signal has been at least partially removed by combining the modified C/A code and the satellite navigational system signal.

20 Claims, 9 Drawing Sheets

(56) References Cited

OTHER PUBLICATIONS

Li, Min, et al., "Switchable Beam Steering/Null Steering Algorithm for CW Interference Mitigation in GPS C/A Code Receivers," IEEE Transactions on Aerospace and ElectronicSystems, vol. 47, Issue 3, Jul. 4, 2011, pp. 1-19.

* cited by examiner

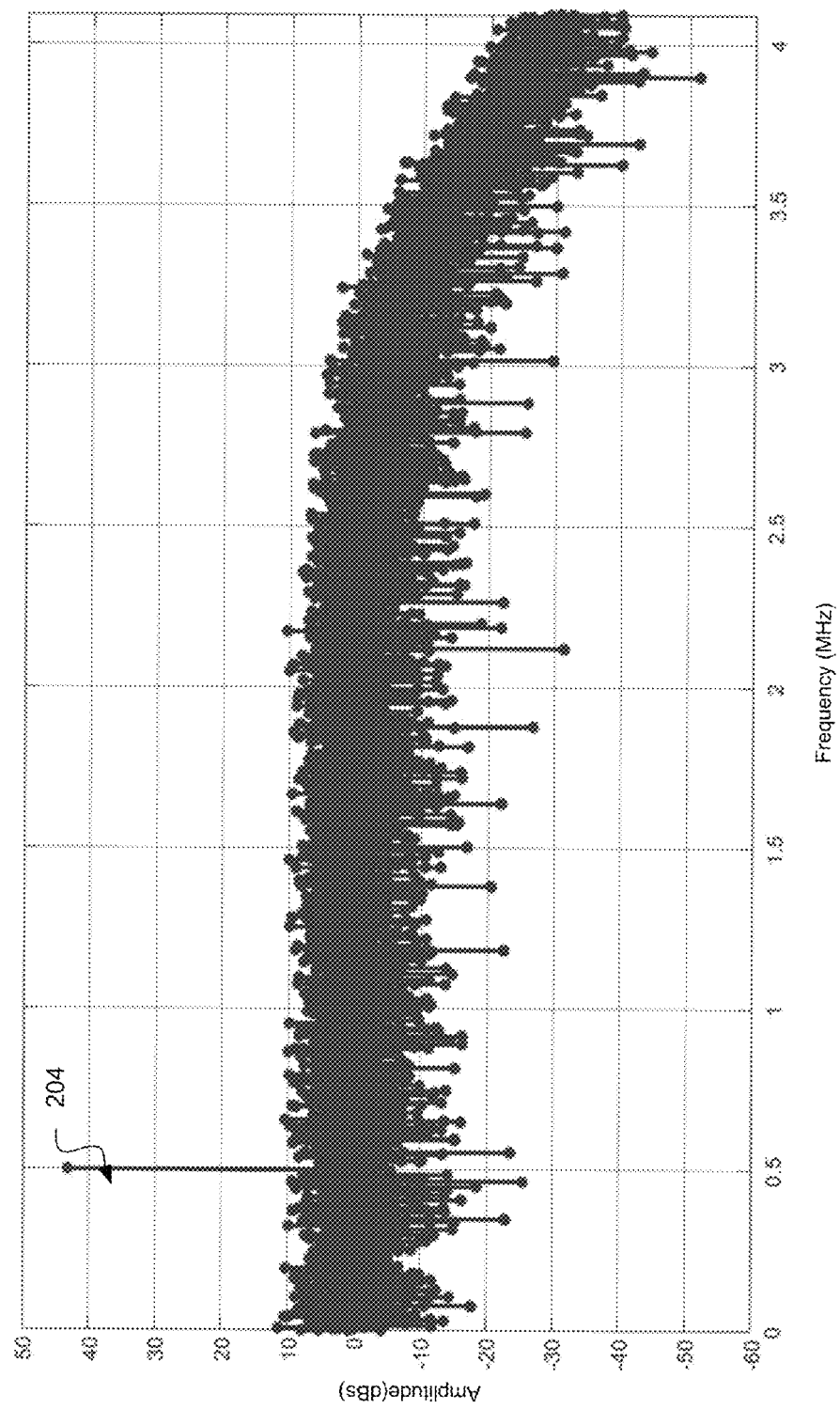

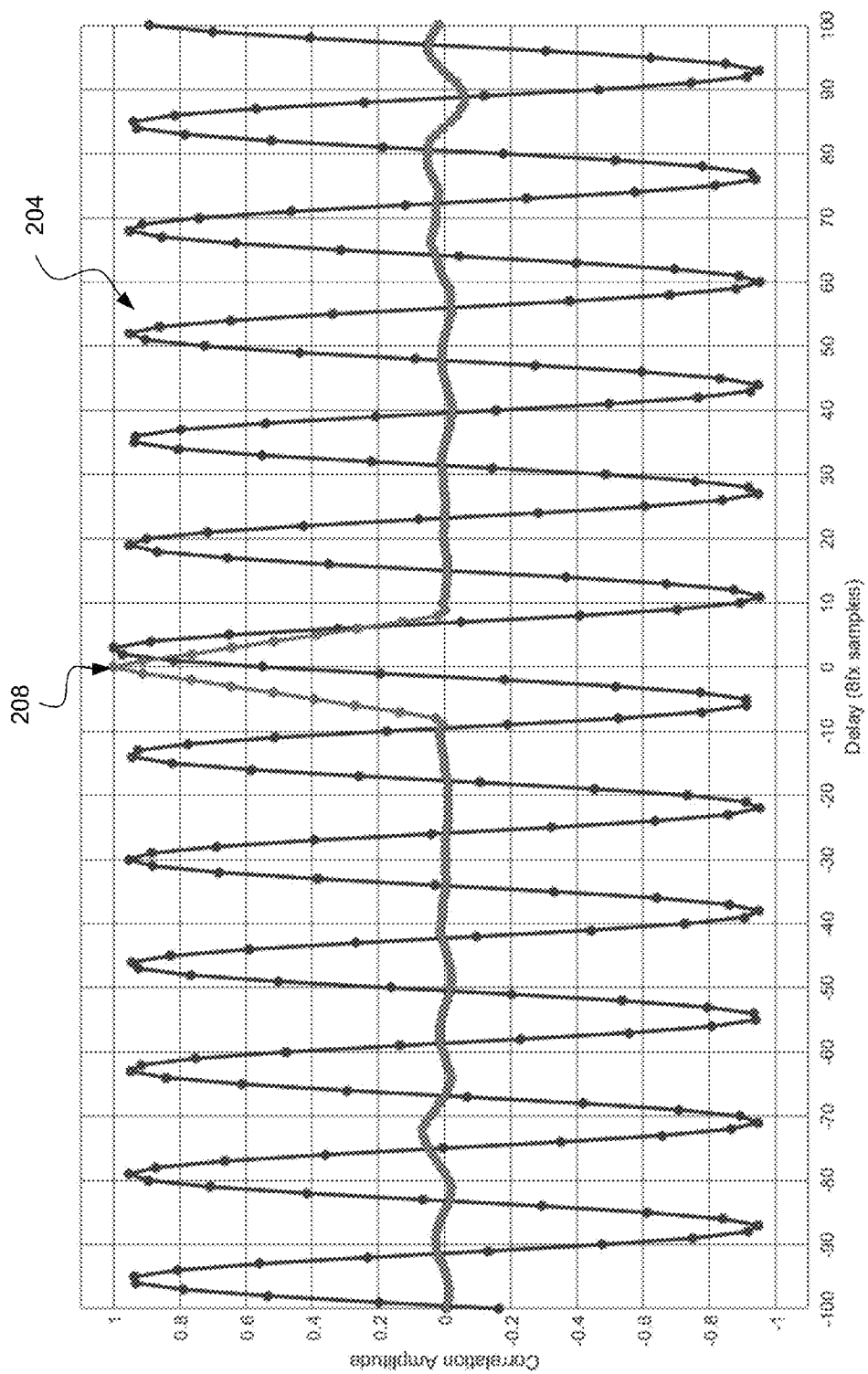

SYSTEM AND METHOD FOR LOCAL SPREADING CODE MANIPULATION FOR INTERFERENCE MITIGATION

CROSS-REFERENCE TO RELATED APPLICATION

This application claims priority under 35 U.S.C. §119 to Provisional Patent Application Ser. No. 62/366,619, entitled "SYSTEM AND METHOD FOR LOCAL SPREADING CODE MANIPULATION FOR INTERFERENCE MITIGATION IN GNSS RECEIVERS" filed on Jul. 25, 2016. The subject matter of this earlier filed application is hereby incorporated by reference.

TECHNICAL FIELD

This description relates generally to wireless or radio communications, and more specifically to a system and method for local spreading code manipulation for interference mitigation.

BACKGROUND

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite System (GNSS) is often used as the generic term for such a system, even though such navigational satellite systems include regional and augmented systems—i.e., systems that are not truly "global." The term "GNSS," as used herein, covers any type of navigational satellite system, global or not, unless expressly indicated otherwise.

The number of GNSS systems, both planned and presently operational, is growing. The widely-known, widely-used, and truly Global Positioning System (GPS) of the United States has been joined by one other global system, Russia's GLObalnaya NAvigatsionnaya Sputnikovaya Sistema (GLONASS), and is presently being joined by Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

Moreover, GNSS capabilities are no longer limited to any particular type of system or device. A GNSS receiver may be implemented in a cellular phone, a tablet computer, a camera, a portable music player, and a myriad of other portable and/or mobile personal consumer devices, as well as integrated into larger devices and/or systems, such as the electronics of a vehicle. The term "GNSS receiver" as used herein, covers any such implementation of GNSS capabilities in a device or system.

Electromagnetic interference (EMI), also called radio-frequency interference (RFI), is a disturbance generated by an external source that affects an electrical circuit by electromagnetic induction, electrostatic coupling, or conduction. The disturbance may degrade the performance of the circuit or even stop it from functioning. In the case of a data path such as a received GNSS signal, these effects can range from an increase in error rate to a total loss of the data. Both man-made and natural sources generate changing electrical currents and voltages that can cause EMI: automobile ignition systems, clock generating circuits, cell phones, thunder storms, the Sun, and the Northern Lights. EMI frequently affects cell phones, AM and FM radios, and televisions. EMI can be used intentionally for radio jamming, as in electronic warfare.

SUMMARY

According to one general aspect, an apparatus may include a receiver, a processor, and a correlator circuit. The receiver may be configured to receive a satellite navigational system signal. The processor may configured to, if an interference signal is detected: receive an indication of a detected interference signal, and generate a modified coarse/acquisition (C/A) code, wherein the modified coarse/acquisition (C/A) code includes a null value for at least one frequency portion associated with the interference signal. The correlator circuit may be configured to, if an interference signal is detected, generate a correlated signal in which the interference signal has been at least partially removed by combining the modified C/A code and the satellite navigational system signal.

According to another general aspect, a method may include receiving, by an antenna, a satellite navigational system signal. The method may include, if an interference signal is detected, receiving an indication of a detected interference signal. The method may include, if an interference signal is detected, generating a modified coarse/acquisition (C/A) code, wherein the modified coarse/acquisition (C/A) code includes a null value for at least one frequency portion associated with the interference signal. The method may include combining the modified C/A code and the satellite navigational system signal in order to create a correlated signal in which the interference signal has been at least partially removed.

According to another general aspect, a system may include a central processing unit (CPU) and a receiver unit. The central processing unit may be configured to execute instructions. The receiver unit may include a receiver circuit, a digital signal processor, and a correlator circuit. The receiver circuit may be configured to receive a radio signal. The digital signal processor configured to: receive an indication of a detected interference signal, and generate a modified coarse/acquisition (C/A) code that includes a null value for at least one frequency portion that is associated with the interference signal. The correlator circuit configured to, if an interference signal is detected, generate a correlated signal in which the interference signal has been at least partially removed by combining the modified C/A code and the satellite navigational system signal.

The details of one or more implementations are set forth in the accompanying drawings and the description below. Other features will be apparent from the description and drawings, and from the claims.

A system and/or method for wireless or radio communications, and more specifically to reducing the effects of signal interference, substantially as shown in and/or described in connection with at least one of the figures, as set forth more completely in the claims.

BRIEF DESCRIPTION OF THE DRAWINGS

FIG. 2C is a graph of an example embodiment of a correlation plot in accordance with the disclosed subject matter.

FIG. 2E is a graph of an example embodiment of a correlation plot in accordance with the disclosed subject matter.

Like reference symbols in the various drawings indicate like elements.

DETAILED DESCRIPTION

Figure 1:
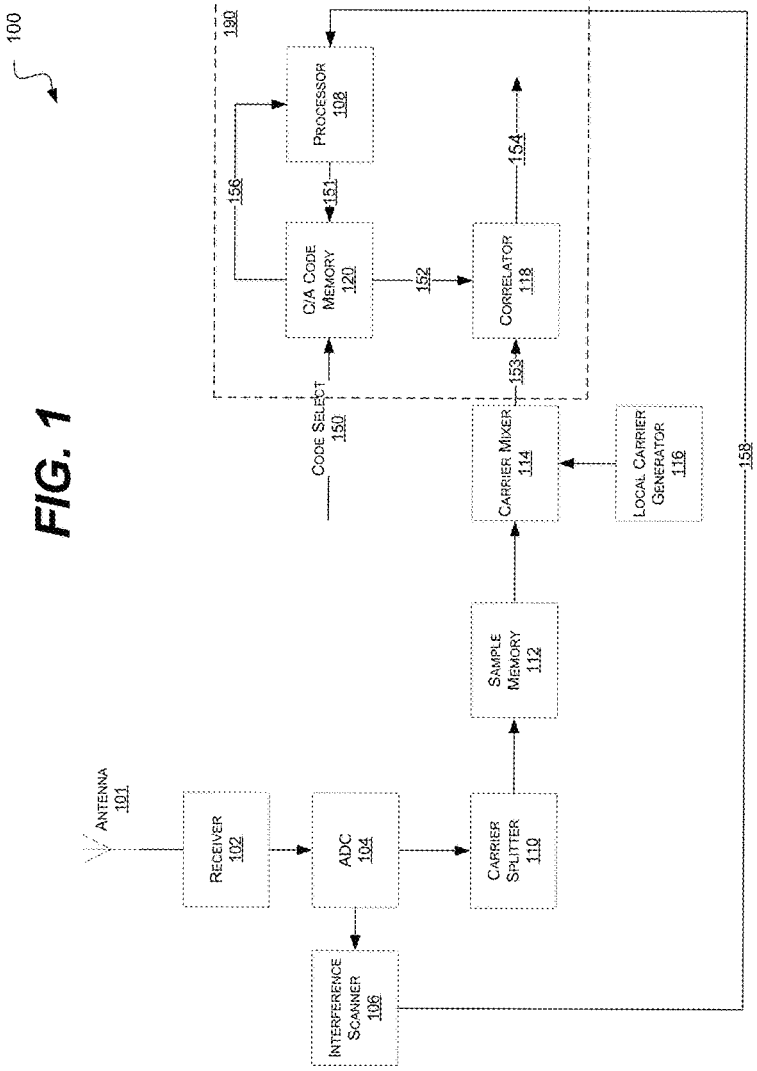
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may be included as part of a mobile device (e.g., a cell phone, a laptop, and a tablet) or a non-mobile device. In various embodiments, the system 100 may be included as part of or include as part of the system 100 a digital signal processor (DSP). It is understood that the above is merely one illustrative example to which the disclosed subject matter is not limited.

In the illustrated embodiment, a signal (e.g., a GNSS signal) may be received by an antenna 101. In some embodiments, multiple antennas 101 may be used. In various embodiments, the antenna 101 may be configured to receive and/or transmit a plurality of different signals (e.g., a cellular signal, a Wi-Fi signal, and a GNSS signal). The antenna 101 may transmit the received signal to a receiver circuit 102.

In various embodiments, the receiver 102 may be configured to receive one or more satellite navigational system signals (e.g., a GPN signal, a GLONASS signal, and a Galileo signal). For the sake of illustration and simplicity, the system 100 will be described as receiving a single satellite navigational system signal, but it is understood that that is merely one illustrative example to which the disclosed subject matter is not limited.

In various embodiments, the signal received may be at a radio frequency (RF). In the receiver 102, the signal may be mixed with an intermediate frequency (IF) signal (not shown) that is produced by a local oscillator. The result of that operation may be a lower frequency representation of the received signal. For example, in one such embodiment, the carrier may be dropped from 1.5 GHz to a few MHz. This may make the digitization of the signal easier and consume less power.

The receiver 102 may pass the signal through an analog-to-digital convertor (ADC) 104. In various embodiments, the ADC 104 may operate at a desired sampling frequency (fs), such as, for example 100 MHz, and 49.107 MHz. Sampling is the fundamental process by which analog signals are converted to digital signals, and the Nyquist sampling rate, which is twice the highest frequency component of the analog signal which is to be sampled, is generally the minimum sampling rate for an ADC such as the ADC 104. In the illustrated embodiment, the output of the ADC 104 sampled signal may include a signal (or series of bits) that include every GNSS signal the system 100 wishes to receive (e.g., 130 satellite signals).

In the illustrated embodiment, the ADC 104 may pass the received signal to an interference scanner 106. The interference scanner 106 may be configured to scan the output of the ADC 104 and look for interference or, more colloquially, jammers. In various embodiments, the interference scanner 106 may include some or all of the subject matter of U.S. Pat. No. 8,238,410, entitled "METHOD AND APPARATUS FOR MITIGATING THE EFFECTS OF NARROWBAND INTERFERING SIGNALS IN A GPS RECEIVER" filed on Dec. 22, 2008. The subject matter of this earlier filed patent is hereby incorporated by reference. The interference scanner 106 may also be configured to identify the interference signal if an interference signal is detected. In some embodiments, the interference scanner 106 may include a spectrum analyzer.

The interference scanner 106 may analyze the signal in terms of power and frequency. In such an embodiment, the interference scanner 106 may identify one of more frequencies in which the power is unusually high. In such an embodiment, the frequencies may be considered to be interference signals. Again, in some embodiments, the interference can be unintentional, such as, for example, clock circuits, and other wireless devices. In another embodiment, the interference may be intentional (i.e. jammers), in which case, the interference is more likely to occur at multiple frequencies. In some cases, no interference may occur, or the level of interference may be below a threshold value and therefore ignored. It is understood that the above are merely a few illustrative examples to which the disclosed subject matter is not limited.

The output 158 of the interference scanner 106 may be sent to a processor 108 or a memory (not shown). The output of the interference scanner may be used later, as described below. In various embodiments, the processor 108 may be a dedicated processor 108. In another embodiment, the processor 108 may be a more general microprocessor. It is understood that the above are merely a few illustrative examples to which the disclosed subject matter is not limited.

In the illustrated embodiment, the output of the ADC 104 may also go through a number of other processing stages. In the illustrated embodiment, the system 100 may include a carrier splitter 110. In such an embodiment, the carrier splitter 110 may be configured to split the received signal into its constituent parts, such as, for example, a GLONASS signal, a GPS signal, and a Galileo signal.

In various embodiments, the carrier splitter 110 may include various filtering and mixing circuits. For example, in one embodiment, the carrier splitter 110 may include a circuit that mixes the ADC 104 output down to the specific GNSS carrier frequency (ultimately based on the original GNSS satellite center transmission frequency) and a low-pass filter (LPF) which matches the specific GNSS spreading code-generated bandwidth. It is understood that the above are merely a few illustrative examples to which the disclosed subject matter is not limited.

In the illustrated embodiment, the system 100 may include a sample memory 112. The sample memory 112 may be configured to store the various portions of the received signal, as output by the carrier splitter 110. In various embodiments, the sample memory 112 may temporarily store a few milliseconds of the signal. Each satellite system signal may be stored and then played back or process at a relatively high speed. This may allow the further processing portions (e.g., a carrier mixer 114, a correlator 118) to operate on the signals at a much higher rate than the signals are received. In such an embodiment, this may allow multiple GNSS signals to be received simultaneously or in parallel, and then processed in series. It is understood that the above is merely one illustrative example to which the disclosed subject matter is not limited.

In the illustrated embodiment, the system 100 may include a carrier mixer 114. In various embodiments, the carrier mixer 114 may be configured to mix a received satellite signal and with a locally generated carrier (e.g., created by a local carrier generator 116). In various embodiments, the input to the carrier mixer 114 may be relatively close to 0 MHz. This allows further integration of the signal without negative effects of carrier rotation (e.g., integration to zero).

In the illustrated embodiment, the system 100 may also include a correlator circuit 118. In various embodiments, the correlator 118 may include a matched filter. Traditionally, a matched filter operates by correlating a known signal, template, or coarse/acquisition (C/A) code, with an unknown or received signal 153 to detect the presence of the template in the unknown signal 153.

In various embodiments, the correlator circuit 118 may be used to bring a locally generated spreading code 152 into time alignment with the incoming satellite signals 153. This time alignment may then be used to measure a range between a satellite and a user device, thus resulting in a navigation solution.

In the illustrated embodiment, the locally generated spreading code 152 is a modified copy of the spreading code transmitted from the satellite. For a GPS system, a spreading code is a coarse/acquisition (C/A) code as defined in "Naystar Global Positioning System: Interface Specification IS-GPS-200", Revision D, 7 Dec. 2004, incorporated by reference herein. The GPS C/A code is a 1023 bit binary code, one per satellite. Typically, a GNSS receiver has replicated this binary code as an input to the matcher filter/correlation process. Typically, a single bit (e.g., −1, +1) representation of the spreading code is used. Therefore, in a traditional system, the width of code 152 would be 1-bit.

According to one embodiment, the present system 100 alters the locally generated C/A code 152 in order to suppress interference when interference is detected. The present system 100 uses a local C/A code 152 that is 1-bit wide when no interference is present, and alters or modifies the locally generated C/A code 152 to generate an M-bit or multi-bit code when interference is detected. The output of the correlator circuit 118 is the correlated signal 154, with the interference removed.

Figure 2A:
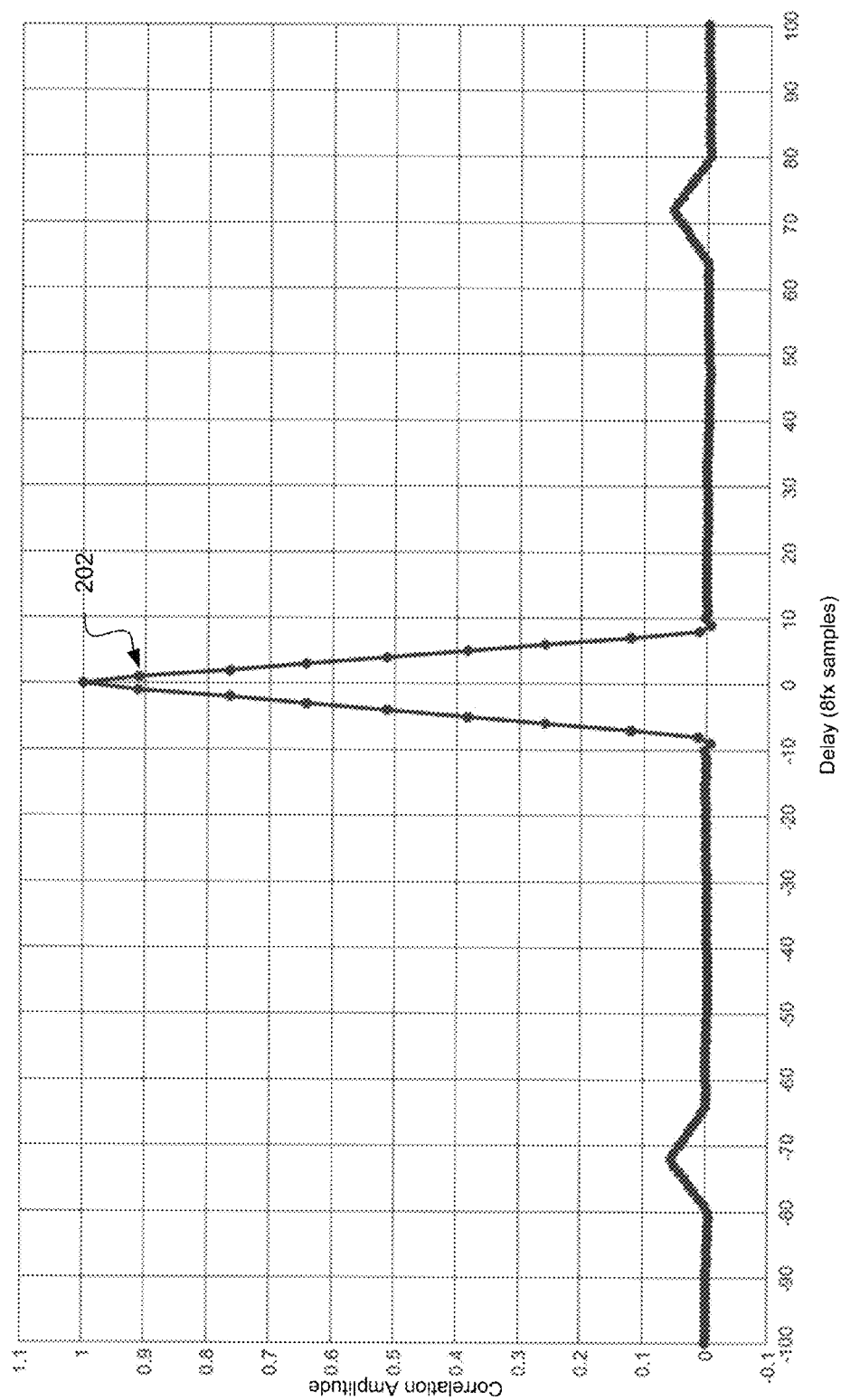
FIG. 2A is a graph of an example embodiment of a correlation plot in accordance with the disclosed subject matter.

If the received signal 153 is perfectly, or nearly perfectly, correlated with the C/A code 152, what is known as a punctual correlator is achieved. FIG. 2A is a graph of an example embodiment of a correlation plot in accordance with the disclosed subject matter. Signal 202 shows a substantial spike at the 0 point in code delay. In the illustrated embodiment, the x-axis is the number of samples difference or un-alignment between the two signals 152 and 153. In this example, the maximum amount of energy is, for signal 202, found at the 0 point of code delay. A, there is almost no energy at any other code delay points. (It is noted there are some auto-correlation sidelobes.) In this example, the received signal has almost no noise or other interference. This received signal is pure or ideal, and therefore the detected correlation is very clear. In such an embodiment, this may be the ideal correlation that the system 100 is attempting to achieve.

Figure 2B:
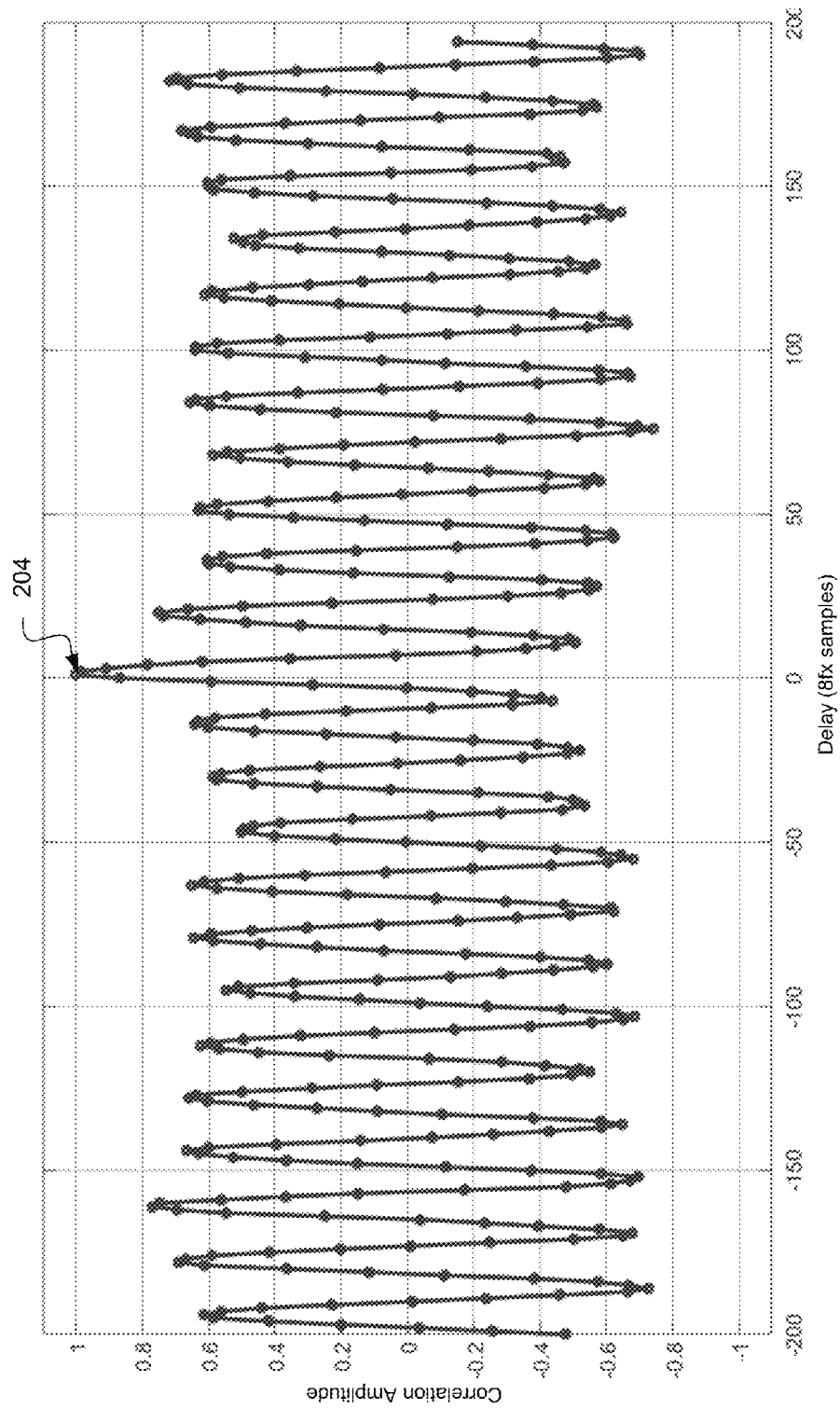
FIG. 2B is a graph of an example embodiment of a correlation plot in accordance with the disclosed subject matter.

FIG. 2B is a graph of an example embodiment of a correlation plot in accordance with the disclosed subject matter. As opposed to the signal 200 of FIG. 2A, signal 204 has significant noise and carrier wave (CW) interference. As such, no obvious correlation can be seen. The correlation is essentially random and heavily distorted. The distortion is bad enough that it would be very difficult for the receiver to acquire, track or decode data from the satellite.

FIG. 2C is a graph of an example embodiment of a pre-correlation plot in accordance with the disclosed subject matter. In the illustrated embodiment, the signal 204 is shown in the frequency domain, with 8fx sampling (e.g., 8fx may equal 8×1 . . . 0230625 MHz). As can be seen the signal 204 has a significant level of interference at a single frequency, approximately 0.5 MHz. This point of interference may be sufficient to cause the lack of correlation shown in FIG. 2B. It is understood that the above is merely one illustrative example to which the disclosed subject matter is not limited.

Returning to FIG. 1, the system 100 may include a coarse/acquisition (C/A) code memory 120. The C/A/code memory may be configured to store the C/A code (e.g., the 1023 bit binary GPS C/A code) that the correlator circuit 118 mixes with the received signal 153.

In the illustrated embodiment, the system 100 may operate in at least two modes. In a first mode, no interference is detected (e.g., by the interference scanner 106). The code select signal 150 may indicate the lack of interference. The C/A code memory 120 may then output the unmodified C/A code (as signal 152) to the correlator circuit 118. As described above, this may be a 1-bit signal.

In the second mode, in which interference is detected, the C/A code memory 120 may then output the unmodified C/A code (as signal 156) to the processor 108 for further processing and modification. In such an embodiment, the processor 108 may be configured to generate or create a modified C/A code 151. In such an embodiment, the processor 108 may null or zero-out the energy signature of the detected interference signal. In such an embodiment, the processor 108 may use the power and frequency information generated by the interference scanner 106 to determine what frequency portion of the C/A code 156 to nullify.

The processor 108 sends the modified C/A code 151 to the C/A code memory 120. In some embodiments, the modified C/A code 151 may be stored in the C/A code memory 120 and repeatedly used. In another embodiment, the C/A code 151 may be generated for each sampled portion of the received signal, or re-computed whenever a change in the interference signal is detected. It is understood that the above are merely a few illustrative examples to which the disclosed subject matter is not limited.

In the illustrated embodiment, the modified C/A code 151 may include a width of a plurality of bits or M-bits. The modified C/A code 151 may be represented by M-bit by N samples, where N is the number of samples representing the length of the C/A code 156. For example, if the samples are 8fx=8 times the nominal C/A code rate of 1.023 MHz, then the modified C/A code 151 may include 1023×8 M-bit samples.

In such an embodiment, when interference is detected, the entire M-bits of the modified C/A code 151 may be input (as signal 152) to the correlator circuit 118. In various embodiments, the correlator circuit 118 may include a number of multiply and accumulate circuits. In such an embodiment, when the received signal 153 is mixed with the modified C/A code 152, the C/A code 152's null value at the interference's frequency portion may cancel out, at least partially, the interference signal.

The correlator circuit 118 may be configured to generate a correlated signal 154 in which the interference signal has been at least partially removed by combining the modified C/A code 152 and the satellite navigational system signal 153. In various embodiments, other signal processing blocks or units may be included in the system 100. In the illustrated embodiment, these processing blocks or units are expected to exist after the correlator circuit 118. It is understood that the above is merely one illustrative example to which the disclosed subject matter is not limited.

Returning to the signal 204 of FIGS. 2B and 2C. As described above, the signal 202 may have a significant level of interference at the 0.5 MHz It is understood that the above is merely one illustrative example to which the disclosed subject matter is not limited.

Figure 2D:
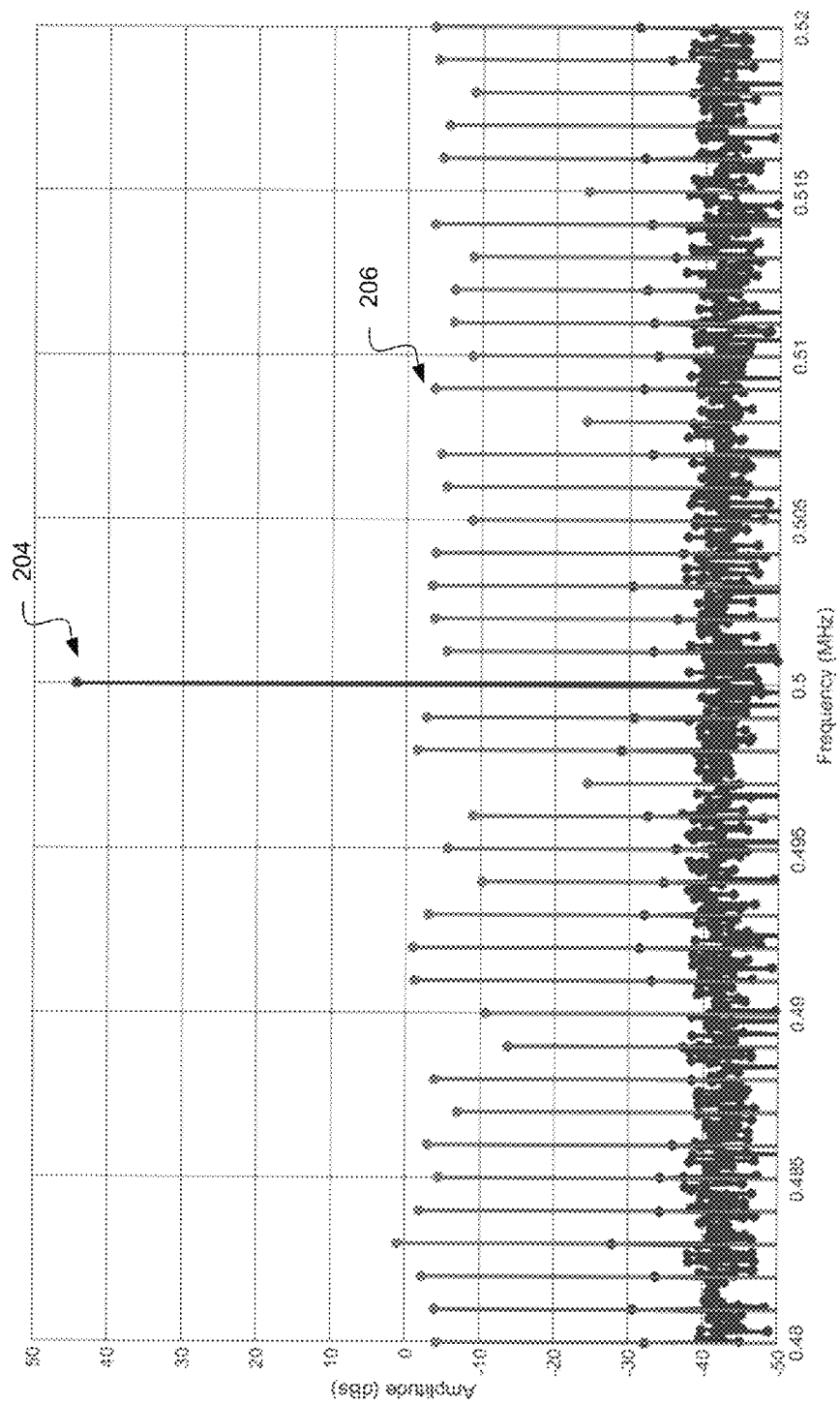
FIG. 2D is a graph of an example embodiment of a frequency domain plot in accordance with the disclosed subject matter.

FIG. 2D is a graph of an example embodiment of a frequency domain plot in accordance with the disclosed subject matter. In the illustrated embodiment, the signal 204 is shown in the frequency domain. Unlike FIG. 2C, only a subset of the frequency spectrum is shown. FIG. 2C ranges from 0 MHz to approximately 4 MHz. FIG. 2D is limited to 0.48 MHz to 0.52 MHz, and the interference of power spike at 0.5 MHz is prominent.

Also shown in FIG. 2D is the modified spreading or C/A code 206. Traditionally, an unmodified spreading or C/A code would include non-zero values for all frequency portions or bins. For example, 1 kHz frequency portions or bins may be employed. In some embodiments, these bins may include thousands of tones. However, in the illustrated embodiment, the modified spreading or C/A code 206 includes zero or null values at the 0.5 MHz frequency portion or bin. As described above, the processor may take the unmodified C/A code and nullify the values that exist at the portion(s) where interference is detected.

In some embodiments, if multiple sources or forms of interference are detected, each of the frequency portions in which interference is detected may be zeroed. In another embodiment, only a subset of the detected frequency portions may be set to zero. In some embodiments, a threshold value may be employed to determine which sub-sets should be nullified. In such an embodiment, the threshold value may be based upon the power level of the detected interference. It is understood that the above is merely one illustrative example to which the disclosed subject matter is not limited.

As described above, the modified spreading or C/A code 206 may be mixed with the signal 204 in a correlating circuit. As part of the mixing operation, the power in the received signal 204 at the nulled frequency portion may be driven to zero. In such an embodiment, the interference may be substantially removed or reduced.

FIG. 2E is a graph of an example embodiment of a correlation plot in accordance with the disclosed subject matter. In the illustrated embodiment, two correlation plots are shown. The correlation for signal 204 is shown repeated, in expanded form, from FIG. 2B. As described above, the interference and noise has caused the correlation operation to essentially fail.

Also shown is a correlation plot for the mixed or correlated signal 208. With the interference removed (at least partially) by the modified spreading or C/A code 206, a correlation spike, similar to that of FIG. 2A, can be seen. In such an embodiment, the modified spreading or C/A code 206 allowed a correlation to be gleaned from a received signal with a high level of interference.

Figure 3:
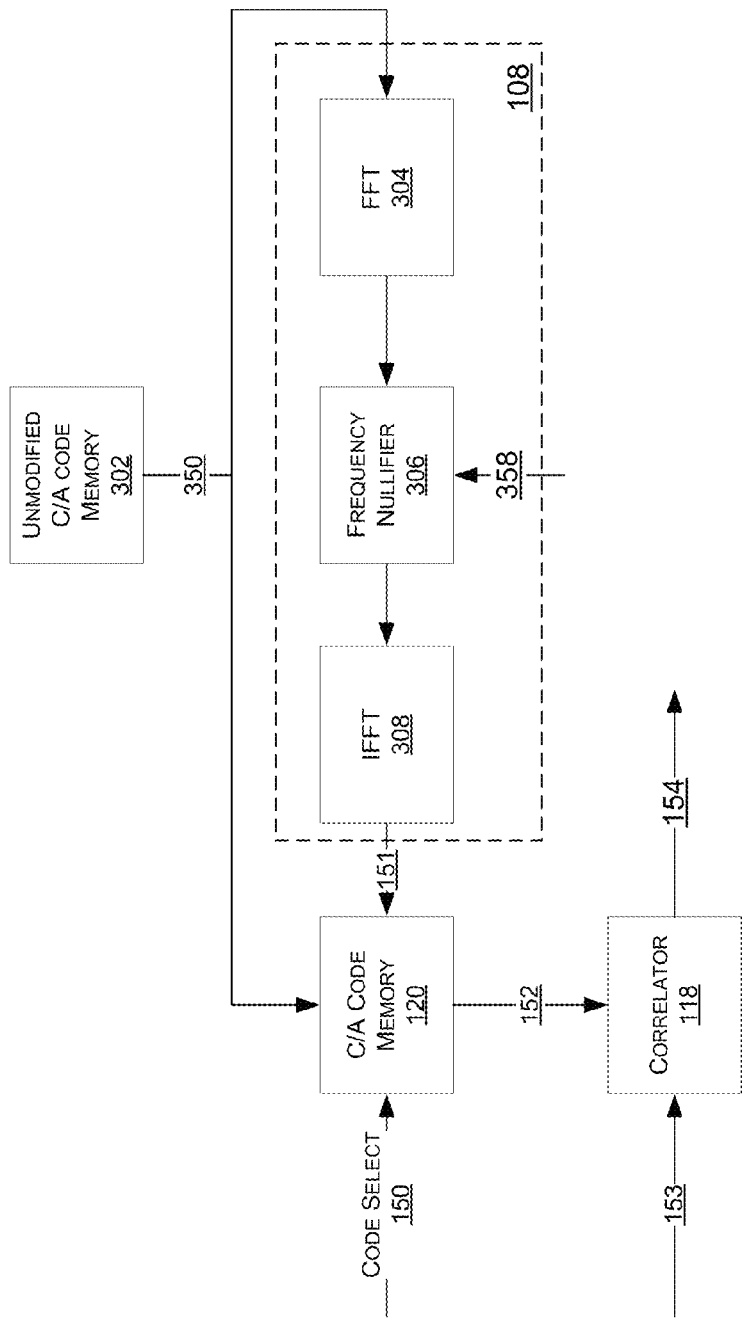
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may be an embodiment of the C/A code and correlator portion 190 of the system 100 of FIG. 1. System 300 may process the signals in the time domain.

In the illustrated embodiment, the incoming or received signal 153 may be processed by a matched filter or correlation circuit 118. If no interference is present or detected (as indicated by the code select signal 150), then the unmodified C/A code (1-bit wide) 350 may be used, as shown by signal 152 being input into the correlator circuit 118.

Conversely, if interference is detected, a modified or locally generated spreading or C/A code 151 may be created and used in the correlating circuit 118. In the illustrated embodiment, the unmodified C/A code 350 may be stored in an unmodified C/A code memory 302. It is understood that the above are merely a few illustrative examples to which the disclosed subject matter is not limited.

In the illustrated embodiment, the unmodified C/A code 350 may be output to the processor 108 for modification. The unmodified C/A code memory 302 may include N (e.g., 1023) number of samples of the C/A code 350.

The processor 108 may include a Fourier transformation circuit 304. In the illustrated embodiment, the Fast Fourier Transform (FFT) is used but it is understood that the above is merely one illustrative example to which the disclosed subject matter is not limited. In various embodiments, the Fourier transformation circuit 304 may operate a one of a plurality of sampling rates (e.g., 1, 2, 4, or 8 times the C/A code's frequency).

The processor 108 may include a frequency nullifying circuit or nullifier 306. In some embodiments, the frequency nullifier 306 may receive the frequency information 356 determined by the interference scanner of FIG. 1.

In the illustrated embodiment, the C/A code 350, after the Fourier transformation circuit 304 may be in the frequency domain, and divided into a series of frequency bins. The frequency nullifier 306 may be configured to null or set to zero those frequency bins of the C/A code 350 that match where the interferers are in terms of frequency. In general, this may be a complex operation with a single continuous wave (CW) interferer requiring nulling of both positive and negative frequency representations of the complex FFT output.

For example, if the signal 'f' has a positive representation in frequency bins or portions 1 . . . (P/2) and a negative representation from (P/2)+1 . . . P. In an example, the frequency nullifier 306 may nullify or zero out the frequency bin P/10. Then the frequency bin P P/10 is nullified, such that the same frequency at positive and negative frequencies are set to zero. Alternatively, if the locally generated code is complex, either a positive frequency or a negative frequency is nulled, not both.

The processor 108 may include an inverse Fourier transform circuit 308. In the illustrated embodiment, the Inverse Fast Fourier Transform (IFFT) is used but it is understood that the above is merely one illustrative example to which the disclosed subject matter is not limited. The now-nullified C/A code may be transformed from the frequency domain back to the time domain as the modified C/A code 151.

As described above, the modified C/A code 151 may include a width of a plurality of bits. Also, as described above, the modified C/A code 151 may be computed once and stored in the C/A code memory 120 for repeated use. It is understood that the above are merely a few illustrative examples to which the disclosed subject matter is not limited.

Figure 4:
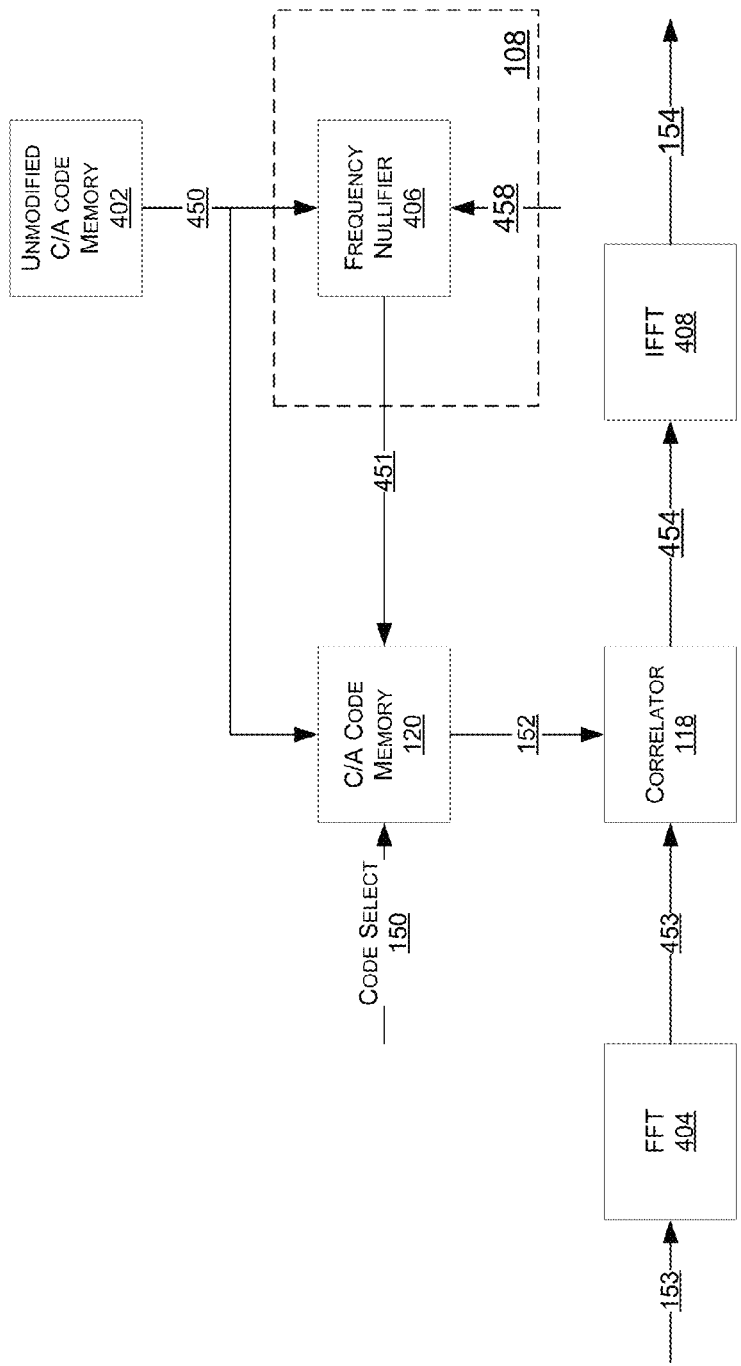
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may be an embodiment of the C/A code and correlator portion 190 of the system 100 of FIG. 1. The system 400 may process the signals in the frequency domain.

In the illustrated embodiment, the incoming or received signal 153 may be processed by a matched filter or correlation circuit 118. However, in this embodiment the correlator 118 may operate in the frequency domain. In such an embodiment, system 400 may include (at some point in the processing pipeline) a Fourier transformation circuit 404. In the illustrated embodiment, the Fast Fourier Transform (FFT) is used but it is understood that the above is merely one illustrative example to which the disclosed subject matter is not limited. The FFT circuit 404 may output a frequency domain version 453 of the received signal 153.

If no interference is present or detected (as indicated by the code select signal 150), then the unmodified C/A code (1-bit wide) 450 may be used, as shown by signal 152 being input into the correlator circuit 118.

Conversely, if interference is detected, a modified C/A code 451 may be used. In the illustrated embodiment, the unmodified C/A code 450 may be stored in frequency domain form in the unmodified C/A code memory 402, and output to the processor 108.

Since the unmodified C/A code 450 is already in the frequency domain, the processor 108 may not require domain transformation circuitry. Instead, the unmodified C/A code 450 may be input directly to the frequency nullifier circuit 406. The frequency nullifier circuit 406 may nullify or set to zero frequency bins in which interference has been detected (as indicated by signal 458).

The frequency nullifier circuit 406 may output a frequency domain version of the modified C/A code 451. The modified C/A code 451 may be stored in the C/A core memory 120 for repeated use. The multi-bit modified C/A code 451 may be output to the correlator 118, when interference is detected, as signal 152. In the illustrated embodiment, the correlator 118 may output the correlated signal 454, which is in the frequency domain.

In the illustrated embodiment, the system 400 may include (at some point in the processing pipeline) an Inverse Fourier transformation circuit 408. In the illustrated embodiment, the Inverse Fast Fourier Transform (IFFT) is used but it is understood that the above is merely one illustrative example to which the disclosed subject matter is not limited. The IFFT circuit 408 may output the frequency domain version 154 of the correlated signal 454.

Figure 5:
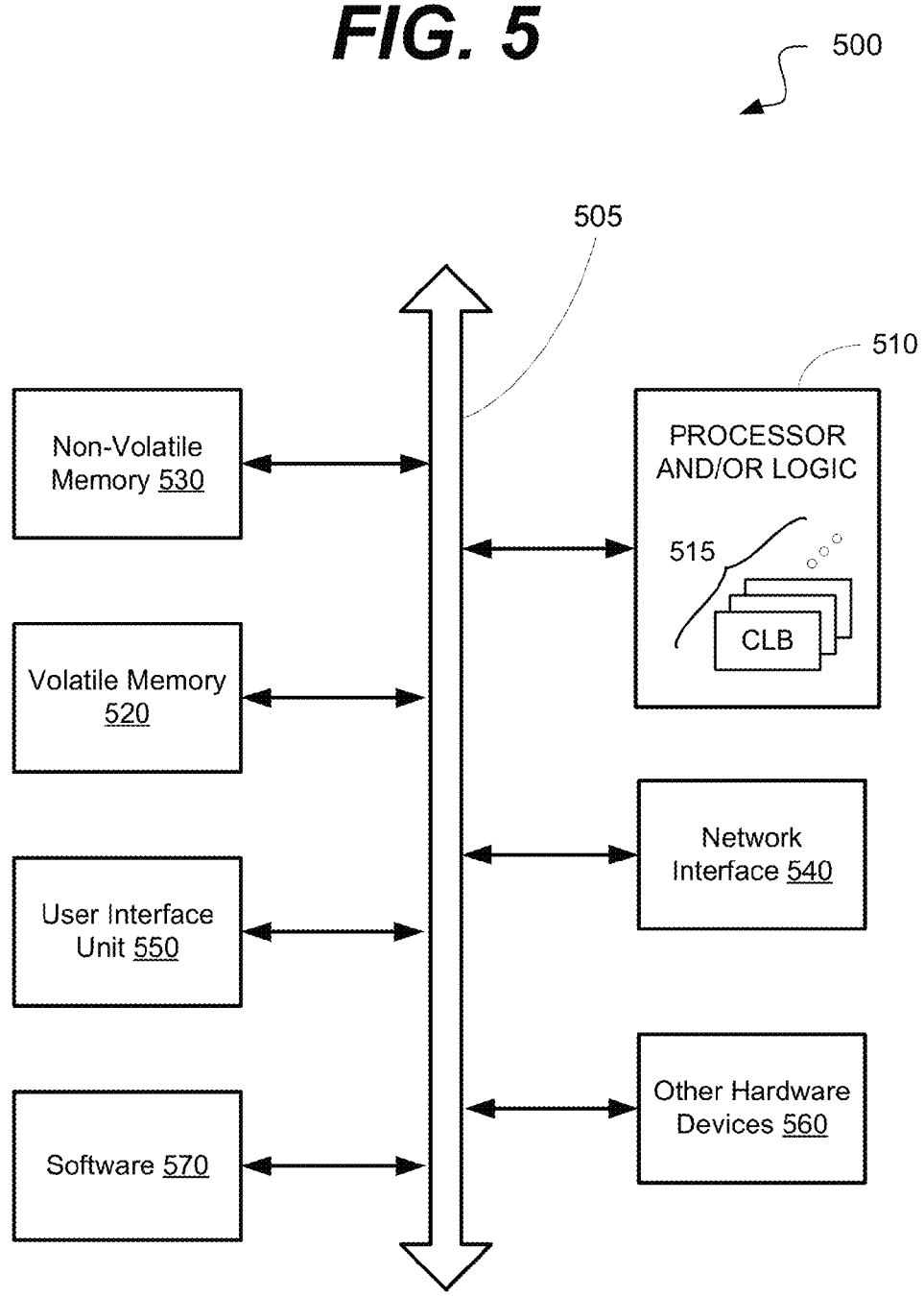
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, and so on or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, and XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may include a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, and IEEE 802.11n. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), and Evolved High-Speed Packet Access (HSPA+). Examples of a wired protocol may include, but are not limited to, IEEE 802.3 (a.k.a. Ethernet), Fibre Channel, and Power Line communication (e.g., HomePlug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, and a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback (e.g., visual feedback, auditory feedback, and tactile feedback); and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, and a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, and AutoHotkey) or a virtual execution machine (VM) (e.g., the Java Virtual Machine, the Microsoft Common Language Runtime,) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, and a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
    a receiver configured to receive a satellite navigational system signal;
    a processor configured to, if an interference signal is detected:
        receive an indication of a detected interference signal, and
        generate a modified coarse/acquisition (C/A) code, wherein the modified coarse/acquisition (C/A) code includes a null value for at least one frequency portion associated with the interference signal; and
    a correlator configured to, if an interference signal is detected, generate a correlated signal in which the interference signal has been at least partially removed by combining the modified C/A code and the satellite navigational system signal.

2. The apparatus of claim 1, wherein the modified coarse/acquisition (C/A) code includes a width comprising a plurality of bits, and a length equal to a number of samples included in an unmodified CA code.

3. The apparatus of claim 1, wherein the processor is configured to:
    compute a Fourier transformed code of an unmodified C/A code;
    set at least one frequency portion of the Fourier transformed code that is associated with the interference signal to zero; and
    compute an inverse Fourier transform of the Fourier transformed code to generate the modified C/A code.

4. The apparatus of claim 1, wherein the processor is configured to generate a single modified C/A code and store the modified C/A code for repeated future use.

5. The apparatus of claim 1, wherein the processor is configured to generate a frequency domain formatted modified coarse/acquisition (C/A) code by setting at least one frequency portion, which is associated with the interference signal, of an unmodified C/A code to zero, and
    store the modified C/A code in a frequency domain format; and
    wherein the correlator is configured to:
        convert the satellite navigational signal to a frequency domain format,
        combine the frequency domain formatted satellite navigational signal with the frequency domain formatted modified C/A code to generate a frequency domain formatted correlated signal, and
        convert the frequency domain formatted correlated signal to a time domain format.

6. The apparatus of claim 1, wherein the correlator comprises a matched filter.

7. The apparatus of claim 1, further comprising a memory configured to store the modified C/A code.

8. The apparatus of claim 1, wherein the indication of a detected interference signal includes a power, a frequency, and a number of the interference signal(s).

9. The apparatus of claim 8, wherein, if the indication of a detected interference signal includes an indication of a plurality of interference signals, the processor is configured to generate a modified C/A code, that includes a null value for less than all of the frequency portions associated with the interference signals.

10. The apparatus of claim 1, wherein the processor is configured to, if an interference signal is not detected, generate a unmodified coarse/acquisition (C/A) code; and
    wherein the correlator is configured to generate the correlated signal by combining the unmodified C/A code and the satellite navigational system signal.

11. A method comprising:
    receiving, by an antenna, a satellite navigational system signal;

if an interference signal is detected, receiving an indication of a detected interference signal;

if an interference signal is detected, generating a modified coarse/acquisition (C/A) code, wherein the modified coarse/acquisition (C/A) code includes a null value for at least one frequency portion associated with the interference signal; and combining the modified C/A code and the satellite navigational system signal in order to create a correlated signal in which the interference signal has been at least partially removed.

12. The method of claim 11, wherein the modified coarse/acquisition (C/A) code includes a width comprising a plurality of bits, and a length equal to a number of samples included in an unmodified CA code.

13. The method of claim 11, wherein generating a modified C/A code comprises:
   computing a Fourier transformed code of an unmodified C/A code;
   setting to zero at least one frequency portion of the Fourier transformed code that is associated with the interference signal; and
   computing an inverse Fourier transform of the Fourier transformed code to generate the modified C/A code.

14. The method of claim 11, further comprising storing the modified C/A code for repeated future use.

15. The method of claim 11, wherein generating a modified C/A code comprises:
   receiving an unmodified C/A code in a frequency domain format, and
   setting to zero at least one frequency portion of the unmodified C/A code which is associated with the interference signal; and
   the method further comprising:
   converting the satellite navigational signal to a frequency domain format,
   combining the frequency domain formatted satellite navigational signal with the modified C/A code to generate a frequency domain formatted correlated signal, and
   converting the frequency domain formatted correlated signal to a time domain format.

16. The method of claim 11, wherein the indication of a detected interference signal comprises:
   for each frequency portion, determining a power level associated with the respective frequency portion, and
   comparing a threshold value to each power level to determine if the interface signal is to be nullified.

17. The method of claim 16, wherein generating a modified C/A code comprises, if a plurality of frequency portions are associated with an interference signal, setting only a subset of the identified frequency portions to a null value.

18. The method of claim 11, wherein if an interference signal is not detected, generating a unmodified coarse/acquisition (C/A) code; and
   generating the correlated signal by combining the unmodified C/A code and the satellite navigational system signal.

19. A system comprising:
   a central processing unit configured to execute instructions; and
   a receiver unit comprising:
      a receiver configured to receive a radio signal,
      a digital signal processor configured to:
      receive an indication of a detected interference signal, and
      generate a modified coarse/acquisition (C/A) code that includes a null value for at least one frequency portion that is associated with the interference signal, and
      a correlator circuit configured to, if an interference signal is detected, generate a correlated signal in which the interference signal has been at least partially removed by combining the modified C/A code and the satellite navigational system signal.

20. The system of claim 19, wherein the modified coarse/acquisition (C/A) code includes a width comprising a plurality of bits, and a length equal to a number of samples included in an unmodified CA code.

* * * * *